United States Patent [19]
Rijhsinghani

[11] Patent Number: 6,112,251
[45] Date of Patent: Aug. 29, 2000

[54] VIRTUAL LOCAL NETWORK FOR SENDING MULTICAST TRANSMISSIONS TO TRUNK STATIONS

[75] Inventor: Anil G. Rijhsinghani, Marlborough, Mass.

[73] Assignee: Cabletron Systems, Inc., Rochester, N.H.

[21] Appl. No.: 09/006,629

[22] Filed: Jan. 13, 1998

[51] Int. Cl.[7] .............................. G06F 15/16; H04B 3/20
[52] U.S. Cl. .......................... 709/249; 709/245; 709/250; 370/389
[58] Field of Search .................................... 709/249, 245, 709/250; 370/389

[56] References Cited

U.S. PATENT DOCUMENTS

| | | |
|---|---|---|
| 4,823,338 | 4/1989 | Chan et al. . |
| 4,845,710 | 7/1989 | Nakamura et al. . |
| 4,933,937 | 6/1990 | Konishi . |
| 5,018,133 | 5/1991 | Tsukakoshi et al. . |
| 5,138,615 | 8/1992 | Lamport et al. . |
| 5,237,661 | 8/1993 | Kawamura et al. . |
| 5,321,693 | 6/1994 | Perlman . |
| 5,394,402 | 2/1995 | Ross . |
| 5,473,599 | 12/1995 | Li et al. . |
| 5,594,732 | 1/1997 | Bell et al. . |

(List continued on next page.)

FOREIGN PATENT DOCUMENTS

| | | | |
|---|---|---|---|
| 0 404 337 | 12/1990 | European Pat. Off. | ........ H04L 12/28 |
| WO 96/08899 | 3/1996 | WIPO | ............................. H04L 12/56 |

OTHER PUBLICATIONS

"Draft Standard P802.1Q/D7" IEEE Standards For Local and Metropolitan Area Networks: Virtual Bridged Local Area Networks, Oct. 3, 1997, XP002103631 Retrieved from Internet: <URL:ftp://p8021: –go_wildcats@8021.hep.net/802 1/q–drafts/d7> see p. 183 –p. 186.

Liu N. H. et al. "A New Packet Scheduling Algorithm For Input–Buffered Multicast Packet Switches" IEEE Global Telecommunications Conference, Phoenix, Arizona, Nov. 3–8, 1997, vol. 3, Nov. 3, 1997, pp. 1695–1699, XP000737812 Institute of Electrical and Electronics Engineers, see paragraph 1.

Mark B. L. et al.:"Large Capacity Multiclass ATM Core Switch Architecture" ISS '97. World Telecommunications Congress. (International Switching Symposium), Global Network Evolution: Convergence or Collision? Toronto, Sep. 21–26, 1997 vol. 1, Sep. 21, 1997, pp. 417–423 XP0000720547.

Chang C–Y et al.:"A Broadband Packet Switch Architecture with Input and Output Queueing" Proceedings of the Global Telecommunications Conference (Globecom), San Francisco, Nov. 28–Dec. 2, 1994, vol. 1, Nov. 28, 1994, pp. 448–452, XP000488590 Institute of Electrical and Electronics Engineers.

Prabhakar B. et al.:"Multicast Scheduling for Input–Queued Switches" IEEE Journal on Selected Areas in Communications, vol. 15, No. 5, Jun. 1, 1997, pp. 855–866, XP000657038 see paragraph 1.

*Primary Examiner*—Krisna Lim
*Attorney, Agent, or Firm*—Wolf, Greenfield & Sacks, P.C.

[57] ABSTRACT

A switch is provided for use in a virtual communications system having multiple local area networks interconnected by multiple switches through a trunk, which has one or more trunk stations connected directly thereto. The switch includes a first communications port connected directly to a first local area network and a second communications port connected directly to the trunk. The first local area network is within a virtual area network configured to include a second local area network and a trunk station. A switch control detects a communication from the first local area network having a multicast address representing desired destination addresses. The switch control appends a VLAN header having a destination address different than but corresponding to the multicast address to the communication to form a VLAN communication and directs transmission of the VLAN communication to the second communication port for delivery to the multicast addressees.

18 Claims, 10 Drawing Sheets

U.S. PATENT DOCUMENTS

| | | |
|---|---|---|
| 5,621,734 | 4/1997 | Mann et al. . |
| 5,627,421 | 5/1997 | Chin et al. . |
| 5,636,215 | 6/1997 | Kubo et al. . |
| 5,734,865 | 3/1998 | Yu . |
| 5,751,967 | 5/1998 | Raab et al. . |
| 5,752,003 | 5/1998 | Hart ................ 709/223 |
| 5,768,257 | 6/1998 | Khacherian et al. . |
| 5,802,056 | 9/1998 | Amato et al. . |
| 5,805,816 | 9/1998 | Pacazo, Jr. et al. . |
| 5,878,232 | 3/1999 | Marimuthu ................ 709/249 |
| 5,892,922 | 4/1999 | Lorenz . |
| 5,949,783 | 9/1999 | Husak et al. ................ 370/396 |
| 5,959,989 | 9/1999 | Gleeson et al. ................ 370/390 |
| 5,963,556 | 10/1999 | Varghese et al. ................ 370/401 |

VIRTUAL LOCAL NETWORK FOR SENDING MULTICAST TRANSMISSIONS TO TRUNK STATIONS

RELATED APPLICATIONS

This application is related to U.S. application Ser. No. 09/006,242 which is filed simultaneously herewith, and incorporated herein by reference.

TECHNICAL FIELD

The present invention relates generally to communications networks and more particularly to virtual local area networks with multicast protection.

BACKGROUND ART

Local area networks (LAN's) are used to facilitate communications between a number of users. Individual LAN's may be bridged together to allow a larger number of users to communicate amongst themselves. These bridged LAN's may be further interconnected with other bridged LAN's using routers to form even larger communications networks.

Prior art FIG. 1 depicts an exemplary interconnected bridged LAN system. The numerals 10, 20, 30, etc., are used to identify individual LAN's. Bridges between LAN's are designated by the numerals 5, 15, 25 and 35. A router between bridged LAN 100 and bridged LAN 200 is identified with the reference numeral 300. In the prior art bridged LAN system depicted, a user A is able to communicate with a user B without leaving the LAN 10. If user A desires to communicate with user C in LAN 20 or user D in LAN 30, the communication is transmitted via bridges 5 and/or 15.

If user A desires to communicate with user E, the communication must be routed via router 300 to bridged LAN 200. As will be understood by those skilled in the art, bridges operate at layer 2 of the network model and transparently bridge two LAN's. It is transparent to users A and C that communications between them are ported over bridge 5 because layer 2 bridges do not modify packets, except as necessary to comply with the type of destination LAN. However, if user A wishes to communicate with user E, the communication must be ported via router 300 which operates at level 3 of the network model. Accordingly, communications over routers flow at a much slower rate than communications over a bridge, and are regulated by the routers.

Therefore, LAN network administrators generally attempt to connect together those users who frequently communicate with each other in bridged LAN's. However, if the bridged LAN becomes too large, it becomes unscaleable and may experience various well-known problems. Accordingly, routers are used to interconnect bridged LAN's so that the bridged LAN's themselves can be kept to an acceptable size. This results in delays in communications between users which are transmitted via the router 300. If, for example, in FIG. 1, user E and user A need to communicate frequently, it would be advantageous to interconnect LAN 10 and LAN 50 via a bridge rather than the router 300. This would require the rewiring of the system which is costly and may be impracticable under many circumstances, such as, if users A and E will only need to frequently communicate for a limited period of time.

Virtual LAN's (VLAN's) have recently been developed to address the deficiencies in interconnected bridged LAN systems of the type depicted in FIG. 1. VLAN's allow LAN's to be bridged in virtually any desired manner independent of physical topography with switches operating at layer 2. Hence, the switches are transparent to the user. Furthermore, the bridging of LAN's can be changed as desired without the need to rewire the network. Because members of one VLAN cannot be transmitted to the members of another VLAN, a fire wall is established to provide security which would not be obtainable in a hardwired interconnected bridged LAN system. Accordingly, VLAN systems provide many advantages over interconnected bridged LAN's.

For example, as shown in prior art FIG. 2, individual LAN's 10–90 are interconnected by layer 2 switches 5'–55'. A network management station (NMS) 290 controls the interconnection of the individual LAN's such that LAN's can be easily bridged to other LAN's on a long term or short term basis without the need to rewire the network. As depicted in FIG. 2, the NMS 290 has configured two VLAN's by instructing, e.g., programming, and thereby configuring the switches 5'–55' such that LAN's 10–60 are bridged together by switches 5'–45' and 55' to form VLAN 100' and LAN's 70–90 are bridged together by switches 35' and 55' to form VLAN 200'. This is possible because, unlike the bridges 5–35 of FIG. 1 which include only two ports, and accordingly are able to only transfer information from one LAN to another LAN, the switches 5'–55' are multiported and programmable by the NMS 290 such that the network can be configured and reconfigured in any desired manner by simply changing the switch instructions.

As shown in FIG. 2, the switch 55' has been instructed to transmit communications from user A of LAN 10 to user E of LAN 50, since both users are configured within VLAN 100'. User A, however, is not allowed to communicate with users H or F since these users are not configured within the VLAN 100' user group. This does not, however, prohibit users F and H, both of whom are members of VLAN 200', from communicating via switches 45' and 55'.

If it becomes desirable to change the network configuration, this is easily accomplished by issuing commands from NMS 290 to the applicable switches 5'–55'. For example, if desired, user H could be easily added to VLAN 100' by simply reconfiguring VLAN 100' at the NMS 290 to cause an instruction to be issued to switch 55' to allow communications to flow between users A–D and E and user H via switch 55', i.e., to include LAN 90 in VLAN 100' and remove it from VLAN 200'.

Because the switches 5'–55' are layer 2 switches, the bridg formed by the switch is transparent to the users within the VLAN. Hence, the transmission delays normally associated with routers, such as the router 300 of FIG. 1, are avoided. The power of the VLAN lies in its ability to dynamically control the network configuration through software on the NMS 290. More particularly, in accordance with its programmed instructions, the NMS 290 generates and transmits signals to instruct the switches 5'–55' to form the desired VLAN configurations.

Multicasting refers to the ability of a station on the network to simultaneously communicate a single message to a number of other stations on the network. In a typical LAN protocol, as shown in FIG. 3, the communication packet 400 includes a destination address 110 having six bytes, a source address 113, and a message portion 114. If the I/G (Individual Group) bit 112 is set to zero, the packet is directed to a single specified address. However, if the I/G bit 112 is set to one, the packet is identified as a multicast packet and is transmitted to all LAN's of the bridged LAN.

For example, referring to FIG. 1, if member A of bridged LAN 100 wishes to multicast to members B and C of bridged LAN 100, the I/G bit of the destination address of the message packet would be set at one. If the I/G bit of the destination address, i.e., the multicast designator, is at one, the bridges 5 and 15 understand that the communication is a multicast communication and direct the communication to all LAN's within the bridged LAN 100 for delivery to the members of the multicast group represented by the multicast address. It will be noted that multicast communications are not routed by routers such as router 300 of FIG. 1. Accordingly, in a conventional interconnected bridged LAN system, multicast communications cannot be distributed between bridged LAN's. Further, because multicast communications within a bridged LAN are distributed to all individual LAN's, e.g., 10–30 in FIG. 1, whether or not any member of the particular LAN within the bridged LAN is a member of the multicast group to whom the sender has addressed the message, network bandwidth may be unnecessarily utilized to communicate the message to the desired recipients.

In a VLAN network, the aforementioned problems are avoided. First, because all switching is done at level 2, i.e., no level 3 routers exist in the system, multicast communications may be transmitted to network members on any LAN within the VLAN. Further, using the NMS 290, a VLAN can be configured to include only those individual LAN's which include members to whom it is desired to transmit the multicast. Thus, network bandwidth is not unnecessarily used to transmit multicast messages to individual LAN's which lack members of the multicast group to whom the multicast communication is addressed. As will be recognized by those skilled in the art, as multicasting continues to grow in popularity, the amount of wasted bandwidth utilization in conventional LAN networks has increased. Hence, multicasting in a VLAN system requires less bandwidth utilization, i.e. multicast communications can be transmitted only to LAN's associated with members of the multicast member group, while providing broader user coverage, i.e. multicast communications can be transmitted to any user within a VLAN, as compared to an interconnected bridged LAN system. Hence, VLAN's offer a significant advantage over standard LAN architectures in this regard.

Further still, because VLAN's can be rearranged or reconfigured dynamically, the members within a multicast group can be increased or decreased simply by modifying the multicast member group using the NMS 290 of FIG. 2. If multicasting becomes excessive over VLAN 100', the NMS 290 can easily modify the multicast member group to exclude one or more LAN's to reduce the multicasting overhead on the VLAN. VLAN 100' can also be easily reconfigured to, for example, include LAN 60, thereby extending the multicast communications capabilities of the VLAN.

Prior art FIG. 4 is a schematic of an exemplary VLAN system. The VLAN system includes LAN's 205–260 which are connected by switches 270–280 to a high-speed LAN backbone or trunk 265. An NMS 290 is interconnected to the switches 270–280 via LAN 260. A trunk station 285 is connected to the high-speed LAN backbone 265 via a trunk port 315. The LAN's 205–215, and 230–235 have designated members F–J. Each of the switches 270–280 is capable of interconnecting the respective LAN's connected to the switch by an access port 305 with each other, e.g. interconnecting LAN's 205–220, and with other LAN's connected by an access port to another of the switches via the high-speed LAN backbone 265, e.g. LAN 205 with LAN's 225–260. For example, switch 270 can be instructed by the NMS 290 to interconnect LAN 205 to LAN 215 by configuring a VLAN including LAN's 205 and 215, thereby facilitating communications between F and H. Switches 270 and 275 can also be instructed by the NMS 290 such that member F of LAN 205 can be interconnected to user I of LAN 230, by configuring a VLAN to include LAN's 205 and 230.

Prior art FIG. 5 depicts a VLAN communications packet 400' which is identical to the LAN communications packet 400 depicted in FIG. 3, except that a VLAN tag 116 has been added to the packet. The tag is appended by the initial switch to which the message packet is directed. The VLAN tag identifies the resulting packet as a "VLAN" or "tagged" packet, and represents the particular VLAN from which the packet originated.

For example, if LAN's 205, 220 and 230 of FIG. 4 are within a single VLAN and member F of LAN 205 desires to communicate with member I of LAN 230, the message 114 of FIG. 5 with the MAP address 110 attached is directed to access port 305 of the switch 270. The switch determines, based upon instructions previously received from the NMS 290, that the member I address falls within the applicable VLAN and, accordingly, adds the appropriate VLAN header to the packet to form packet 400', as shown in FIG. 5. The packet 400' is then directed via trunk port 315 to the high-speed backbone LAN 265 and detected by switches 275 and 280.

Since switch 280 lacks any access ports connected to LAN's within the applicable VLAN, switch 280 discards the communication. Switch 275 however, identifies the VLAN header 116 of packet 400' as associated with a VLAN which includes LAN 230. The switch 275 accordingly removes the header and directs the communication, which now appears as message 400 of FIG. 3, to LAN 230 over which the member I receives the message.

Trunk stations, such as trunk station 285, are incapable of recognizing VLAN headers. Further, since no programmable switch is disposed between a trunk station and the trunk, communications with a VLAN header appended thereto will be ignored and/or discarded by the trunk station. Hence, in conventional VLAN systems, such as that shown in FIG. 4, the trunk stations, e.g. trunk station 285, form part of the default group, i.e. the group of system users not within any VLAN. Accordingly, in FIG. 4, any system user on LAN's 205–260 can communicate with the trunk station.

Although conventional VLAN systems have numerous advantages over conventional interconnected bridged LAN systems, a need remains for a VLAN system in which access to trunk stations can be limited to only members of particular LAN's within the system. For example, if the trunk station 285 is a secure server, it may be appropriate to limit access to trunk station 285 to only members of particular LAN's. This need is addressed by the invention disclosed in the above-referenced related application. That application describes a general technique for limiting access to trunk stations to only members of particular LAN's within a VLAN system. However, a problem may arise in multicasting communications to a trunk station which is configured within the applicable VLAN multicast group where the VLAN system operates under special high efficiency protocols.

OBJECTIVES OF THE INVENTION

Accordingly, it is an object of the present invention to provide a VLAN system which facilitates multicast communications to trunk stations.

It is another object of the present invention to provide a VLAN system for multicasting communications to trunk stations in a manner which avoids corrupted data being processed by the recipient trunk station.

It is a further object of the present invention to provide a VLAN system in which trunk stations process multicast communications from system users in an efficient manner while avoiding the corruption of data.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

In accordance with the present invention, a switch, which is preferably a multiported reconfigurable switch, is provided for use in a virtual communications system having multiple local area networks interconnected by multiple switches through a backbone trunk which has one or more trunk stations connected directly thereto. The switch includes a first communications port, e.g. an access port, for connecting directly to a first local area network and a second communications port, e.g. a trunk port for connecting directly to the trunk.

A switch control, e.g., a control console, is provided to detect a communication, received at the first port, from the local area network, having a multicast address representing desired destination addresses. The switch control appends, to the communication, a VLAN header having a destination address different than but corresponding to the multicast address to thereby form a VLAN communication. The switch control then directs transmission of the VLAN communication to the second communication port from which it is transmitted by a trunk to the addressees, typically, in the case of addressees other than trunk stations, via other switches.

For example, if the local area network is within a virtual area network configured to include another local area network and a trunk station, the switch control will detect a communication from the local area network having a multicast address representing desired destination addresses, which may include the trunk station and/or the other local area network.

The switch control duplicates the communication, forming first and second communications, and then appends a VLAN header, having a special destination address which is different than but corresponds to the multicast address, to only the first communication to form a VLAN communication. The control console next directs transmission of the VLAN communication and the second communication to the second communication port.

In this way, trunk stations within the VLAN multicast group will detect a VLAN header of the VLAN communication having a destination address which is not understood and will therefore ignore the VLAN communication. The trunk stations will however also detect the second communication which includes a multicast address which is understood and accordingly the second communication can be utilize by the trunk station to obtain the message.

On the other hand, if such communications are received from another switch, the switch control will detect the communications from the trunk at the second communications port. The switch control will discard the communication without the VLAN header, and if, based upon the special destination address, none of the LAN's directly connected to the switch are within the multicast address, will also discard the VLAN communication. However, if the desired destination addresses, as indicated by the special destination address, include a local area network directly connected to the switch, e.g. by the first port, the switch control removes the VLAN S header from the VLAN communication and directs transmission of the communication to the applicable port for delivery to the appropriate local area network and from there to the intended recipient. More particularly, in such a case the switch control detects the VLAN communication and recognizes from the special destination address that it is addressed to a user of a local area network to which it is connected via an access port. The switch control then removes the VLAN header from the VLAN communication, and directs transmission of the communication to the appropriate local area network for delivery to the addressee.

In accordance with other aspects of the present invention, a virtual communications system has a trunk, and first and second switches connected thereto by respective trunk ports. A trunk station is also connected to the trunk by another trunk port. A local area network is connected to the first switch by an access port and another local area network is connected to the second switch by an access port. A network manager is interconnected to the first and the second switches for configuring virtual area networks.

The network manager may configure a virtual area network to include both local area networks and the trunk station. In such a case, the local area network connected by access port to the first switch can issue a communication which has a multicast address representing desired destination addresses including the other local area network and/or the trunk station. The first switch detects the communication and duplicates it to form first and second communications. The switch appends a VLAN header, having a special destination address which is different than but corresponds to the multicast address, to the first communication to form a VLAN communication, and directs transmission of both the VLAN and non-VLAN communications to the trunk for delivery, as appropriate, to the other local area network and/or the trunk station.

The second switch detects the VLAN communication, and if the other local area network is included as a multicast addressee, as indicated by the special destination address, the second switch removes the VLAN header from the VLAN communication and directs transmission of the communication to the other local area network for delivery to the addressee. The second switch simply ignores and/or discards the non-VLAN communication. The trunk station also detects the VLAN and non-VLAN communications. Because the VLAN communication's special destination address cannot be understood by the trunk station, the trunk station ignores and/or discards the VLAN communication. If the trunk station is a multicast addressee, it utilizes the non-VLAN communication to obtain the message.

Hence, in accordance with aspects of the invention, a virtual area network is configured to include first and the second local area networks and the trunk station. A communication from the first local area network having a multicast address representing desired destination addresses including the second local area network and/or trunk station can be detected. The detected communication is duplicated and one copy of the communication is appended with a VLAN header, having a special destination address which is different than but corresponds to the multicast address, to form a VLAN communication. Both communications, i.e, the communication with and without the VLAN header, are directed to the trunk for delivery to the multicast addressees. The VLAN communication is detected and the VLAN header removed before directing transmission of the communication to the second local area network. The trunk station detects only the transmitted communication which lacks the VLAN header.

According to other aspects of the invention, the VLAN communications packet includes a first portion, e.g. a communication issued from a LAN, having a multicast address, and a second portion, e.g. a VLAN header, appended to the first portion and including a special destination address which is different than but corresponds to the multicast address. The special destination address serves as a special multicast address which is understood by system switches but not by system trunk stations. Preferably, the first portion of the packet is sequentially arranged with a first section of a first bit length containing the multicast address, and a second section, e.g, the layers of the communication having the source address and protocol, of a second bit length, and a third section containing message data and having a third bit length. The second portion, preferably, is also sequentially arranged with a first layer of the first bit length containing the special destination address, and a second section, e.g., including the layers of the VLAN header having the source address, VLAN protocol and VLAN tag, of a second bit length. Hence, the bit lengths of the layers containing the multicast and special destination addresses are the same. Beneficially, the second portion is removable from the communications packet such that the special destination address is disposed at a head of the entire VLAN communication packet, while the multicast address is disposed at a head of a remainder of the VLAN communication packet, e.g., the original LAN communications packet, with the second portion removed therefrom.

BEST MODE FOR CARRYING OUT THE INVENTION

Figure 6:
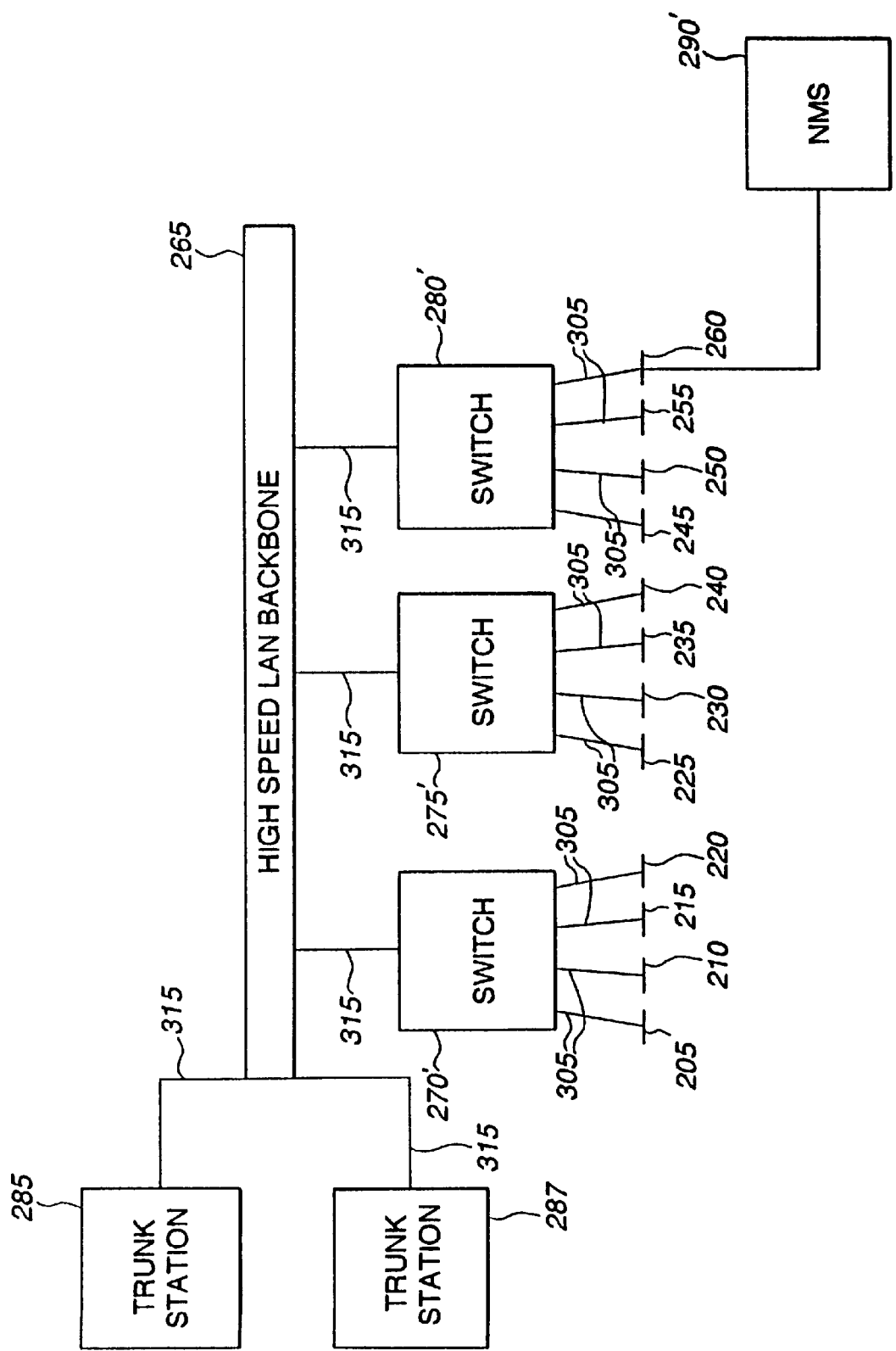
FIG. 6 depicts a schematic diagram of a VLAN system in accordance with the present invention.

FIG. 6 depicts a virtual communications system or network in accordance with the present invention. The network includes multiple local area networks (LAN's) 205–260 interconnected by multiple multiported reconfigurable switches 270', 275' and 280' all of which are connected by a high speed backbone LAN 265, often referred to as the trunk. Each LAN, other than the backbone LAN 265 is connected to one of the switches 270', 275' or 280' by an access port 305, while the backbone LAN 265 is connected to each switch by a trunk port 315. A network management system (NMS) 290', which may be a workstation having the network management software loaded thereon, manages the network by configuring the network via the switches 270', 275' and 280' to form one or more virtual local area networks (VLAN's). Each of the trunk stations 285 and 287 is connected to the backbone LAN 265 via a trunk port 315. The trunk stations 285 and 287 may, for example, be network servers or other network resources to which some or all of the members of the of the LAN's 205–260 may require high speed access from time to time or on a continuous basis as is well understood in the art.

Figure 7:
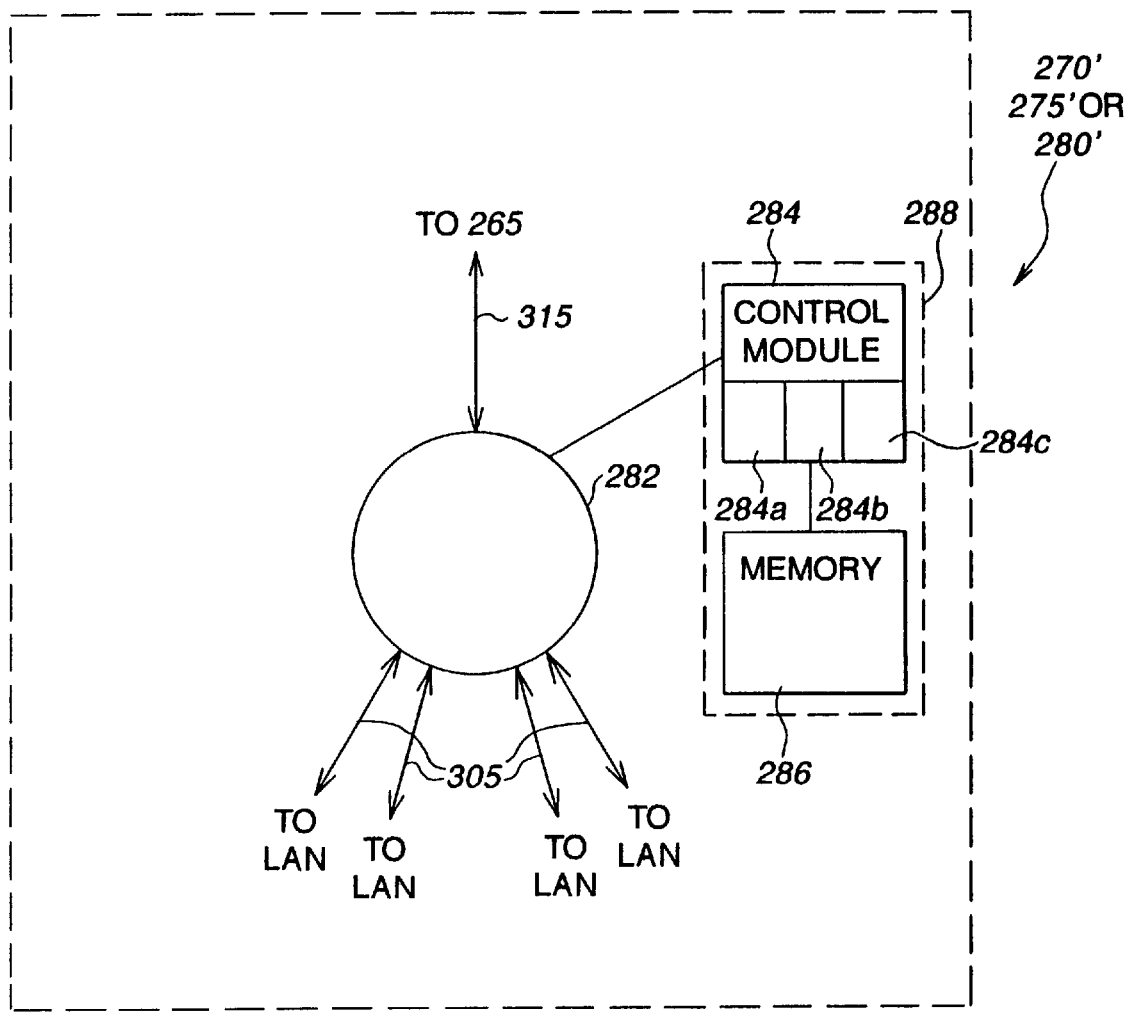
FIG. 7 depicts a switch in accordance with the present invention for use in the FIG. 6 system.

Referring to FIGS. 6 and 7, each of switches 270', 275' and 280' is capable of linking, via the backbone LAN 265, members of each of the LAN's 205–260 to members of the one or more other LAN's and the trunk stations within the VLAN's configured by the NMS 290'. In accordance with the present invention, the NMS 290' may configure any or all of these VLAN's to include the truck stations 285 and 287, as will be further described below.

As shown in FIG. 7, each of the switches 270', 275' and 280' includes a control console 288 having a control module 284 and a memory 286 for storing and processing control and VLAN configuration instructions and data which may be initially programmed into the switch or transmitted to the switch by the NMS 290'. The control module 284 includes a controller 284a for controlling the switching device 282. The detector 284b detects a communication received from the backbone 265 via a trunk port 315 or from a LAN directly connected to the switch via an access port 305. Communications from the backbone 265 may or may not include a VLAN header of the type previously describe with reference to FIG. 5. For example, communications from a LAN to a member of the default group will not be tagged, i.e. appended with a VLAN header, by the switch to which the LAN connects via an access port 305. Thus, if one of the LAN's within the system is in the default group, communications to this LAN from members of other LAN's will not be tagged.

The detector 284b detects all communications over the backbone LAN 265, including, in the case of switches 270' and 275', communications from the NMS 290'. Switch 280' detects communications from the NMS at the access port connected to LAN 260. If the detected communication is deliverable to a network addressee on any of the LAN's connected to an access port of the applicable switch, the controller 284a of the applicable switch controls the switching device 282 to transmit the message from the trunk port 315 to the applicable access port 305. That is, if the detected communication is properly addressed to the addressee and forwarded from an authorized member of the system, e.g. from a member of a VLAN which includes the addressee's LAN or from any other member of the system if the addressee is a member of the default group, the controller 284a of the applicable switch controls the switching device 282 to transmit the message to the applicable LAN.

The control module 284 also includes a tagger 284c for tagging communications received via an access port 305 for transmission from one member to another member of a configured VLAN by appending a VLAN header thereto. The tagger 284c also removes the VLAN header from a communication received from the switch's trunk port 315 which is to be forwarded to a member of a LAN connected to the switch by an access port. More particularly, the tagger 284c discards the tag by removing the VLAN header from the communication, prior to the message being transmitted to the appropriate output port 305, i.e. prior to the controller 284a controlling the switching device 282 to transmit the message from the trunk port 315 to the access port 305.

If the detected communication has been received via an access port 305 of the switch and is properly addressed and deliverable to a network addressee on any of the other LAN's connected to the switch, the controller 284a of the switch controls the switching device 282 to transmit the message from the input access port 305 to the applicable output access port 305. In such a case, if the sender and addressee are members of the same VLAN, there is no need to append a VLAN header to the communication before directing it to output port 305. However, if such a communication is to be multicast to one or more LAN's within the applicable VLAN which are directly connected to other switches by access ports, the communication output from the trunk port 315 of the applicable switch will, of course be tagged by the tagger before transmission via the trunk 265 as discussed above.

Accordingly, all messages between LAN's within configured VLAN's are forwarded to the appropriate addressee LAN. This is accomplished by identifying communications between LAN's within configured VLAN's and tagging the communications, except for those between LAN's connected by an access port to the same switch, with a VLAN header.

Figure 8:
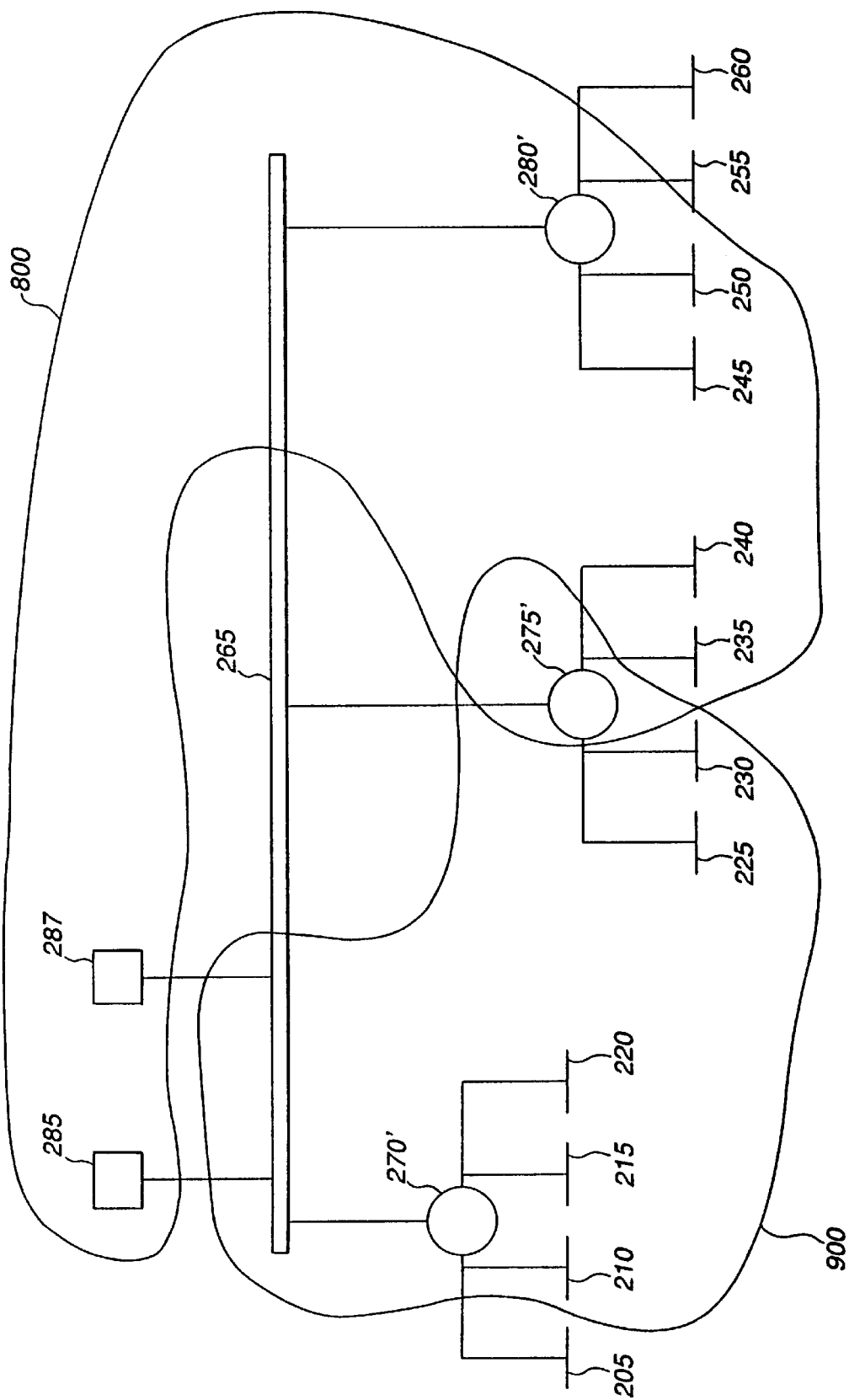
FIG. 8 depicts a VLAN configuration in accordance with the present invention.

The operation of the VLAN system and the switches depicted in FIGS. 6 and 7 will be described with reference to FIG. 8. As shown, the NMS 290' has configured the VLAN system into a first VLAN 800 which includes LAN's 235–250 and trunk stations 285 and 287. The NMS 290' has also configured a second VLAN 900 to include LAN's 210–230. Each of the switches has accordingly been instructed and preferably stores information representing each of the VLAN configurations in its memory 286 for use by the control module 284 in detecting, tagging and removing tags from communications received via access ports 305 and trunk port 315, and in controlling the switching device 282. Because the trunk stations 285 and 287 are excluded from the VLAN 900, attempted communications between the trunk stations 285 and 287 and members of LAN's 210–230 which are received by the applicable switch via an access or trunk port are ignored and/or discarded, since the sender and addressee are not within the same VLAN. Further, default group LAN's 205, 255 and 260 are likewise prohibited from communicating with the trunk stations 285 and 287.

As described in the above-mentioned related application, members of each of the LAN's 235–250 are allowed by the applicable switch 275' or 280' to unicast or multicast communications to the trunk stations 285 and 287. For example, if a member of LAN 250 desires to unicast a message to the trunk station 285, the communication received at the access port of the switch 280' will be detected by the detector 284b. The control module 284 determines, utilizing the stored configuration data, that the message is addressed to a trunk station within VLAN 800 and therefore controls, by way of the controller 284a, the switching device 282 to output the communication to the trunk 265 via the trunk port 315. Because the communication has been determined by the control module to be addressed to a trunk station on the sender's VLAN, the communication is output from the trunk port without a VLAN header being appended thereto. Accordingly, the trunk station 285, which is unable to recognize communications encapsulated with a VLAN header, is able to recognize the untagged communication from the LAN 250 and thereby receives the message from the sender.

The switches 270' and 275' in the VLAN system will also receive the communication. However, because the message has been forwarded without a VLAN header, it will be ignored and/or discarded by switch 275' which has access ports connecting only to LAN's within configured VLAN's, i.e., LAN's 225–240. The switches 270' and 280', which have access ports connected LAN's within the default group, i.e., LAN's 205, 255 and 260, after determining that the communication is not addressed to any of the members of these LAN's, will likewise ignore and/or discard the communication. The trunk station 287 will also detect the communication and, after determining that the communication is not addressed to it will ignore and/or discard the communication. Hence, since the communication is addressed only to the trunk station 285, except for the transmission by the communication by switch 280' to the trunk 265, the switches and the trunk station 287 will ignore the communication.

If the trunk station 285 unicast a message to a member of the LAN 250, the communication received at the trunk port 315 of the switch 280' will be detected by the detector 284b. The control module 284 will determine, utilizing the stored configuration data, that the LAN 250 and the trunk station 285 are both configured within VLAN 800, and therefore will control, by way of the controller 284a, the switching device 282 to output the communication to the LAN 250 via the applicable access port 305. Accordingly, the switch 280', is able to recognize the untagged communication from the trunk station 285, and forward the message to the addressee on the LAN 250, in accordance with the instructions previously received from the NMS 290'.

The other trunk 287 and switches 270' and 275' in the VLAN system will also receive the communication transmitted from trunk station 285. However, because the message has been forwarded without a VLAN header, it will be ignored and/or discarded by switch 275' which has access ports connecting only to LAN's within configured VLAN's, i.e. LAN's 225–240. The switch 270', which has an access port connecting to a LAN within the default group, i.e LAN 205, after determining that the communication is not addressed to any of the members of the LAN 205, will likewise ignore and/or discard the communication. The trunk station 287 will also detect the communication and, after determining that the communication is not addressed to it, will ignore and/or discard the communication. Hence, since the communication is addressed only to a member of LAN 250, except for the transmission of the communication by the switch 280' from the trunk port 315 to the applicable access port 305, the switches 270'–280' and the trunk station 287 will ignore the communication after detection.

As also described in the above-referenced related application, if a member of LAN 235 desires to multicast a communication to trunk station 287 and a member of LAN 245, the switch 275', which receives the communication via an access port 305, will detect the communication by means of detector 284b. The control module 284 will then determine, based upon configuration data stored in the memory 286, that the multicast communication is addressed to members of VLAN 800. It will also recognize from the configuration data that VLAN 800 includes both trunk stations and other LAN's. Accordingly, the control module 284 will duplicate the communication. One copy of the communication will be tagged by the tagger 284c with a VLAN header, thus encapsulating that copy of the communication so as to form a VLAN communication. The controller 284a will then control the switching device 282 to output both the encapsulated communication and the unencapsulated communication to the backbone 265 via the switch's trunk port 315.

The encapsulated message is received by the switch 280' at the trunk port 315 connected to the backbone 265. The detector 284b of switch 280' detects the VLAN header and recognizes, based upon the configuration data stored in its memory 286, that LAN's 245 and 250 are members of the VLAN 800. Accordingly, the tagger 284c of the switch removes and discards the VLAN header from the communication and the controller 284a controls the switching device 282 such that the communication, with the header now removed, is directed via output access ports 305 to LAN's 245 and 250. The message is discarded by LAN 250 and delivered by LAN 245 to the appropriate addressee in the conventional manner. The unencapsulated message output from the trunk port 315 of the switch 280' is received, via the trunk 265, by the trunk station 285 and thereby delivered to the trunk station. Accordingly, by configuring the trunk stations 285 and 287 within VLAN 800, members of VLAN 800 can unicast or multicast communications to the trunk stations.

If a member of LAN 240 desires to multicast only to LAN's 235, 245 and 250, the switch 275', to which the LAN 240 is connected by an access port 305, detects the message with its detector 284b and, recognizing the message as a multicast communication to members of VLAN 800 which includes trunk stations, will automatically duplicate the communication, tag one copy of the communication and transmit both the encapsulated and unencapsulated copies of the communication to the trunk 265 via the trunk port 315.

Similarly, should a member of LAN 240 desire to multicast a communication only to trunk stations 285 and 287, the switch 275', to which LAN 240 is connected via an access port 305, duplicates and tags one copy of the communication before outputting both the encapsulated and unencapsulated communications to the trunk 265 via the switch's trunk port 315.

Because the trunk stations 285 and 287 are configured within the VLAN 800, a fire wall is provided between the trunk stations 285 and 287 and the members of LAN's 205–230 and 255–260. As discussed above, if desired the LAN 800 may be easily reconfigured by the NMS 290' to delete any of the LAN's 235–250 or trunk stations 285 and 287 from the VLAN 800. The system can also be easily reconfigured by the NMS 290' to add any of the LAN's 205–230 and 255–260 to the VLAN 800 to allow other members of the system to communicate with the trunk stations 285 and 287.

Figure 1:
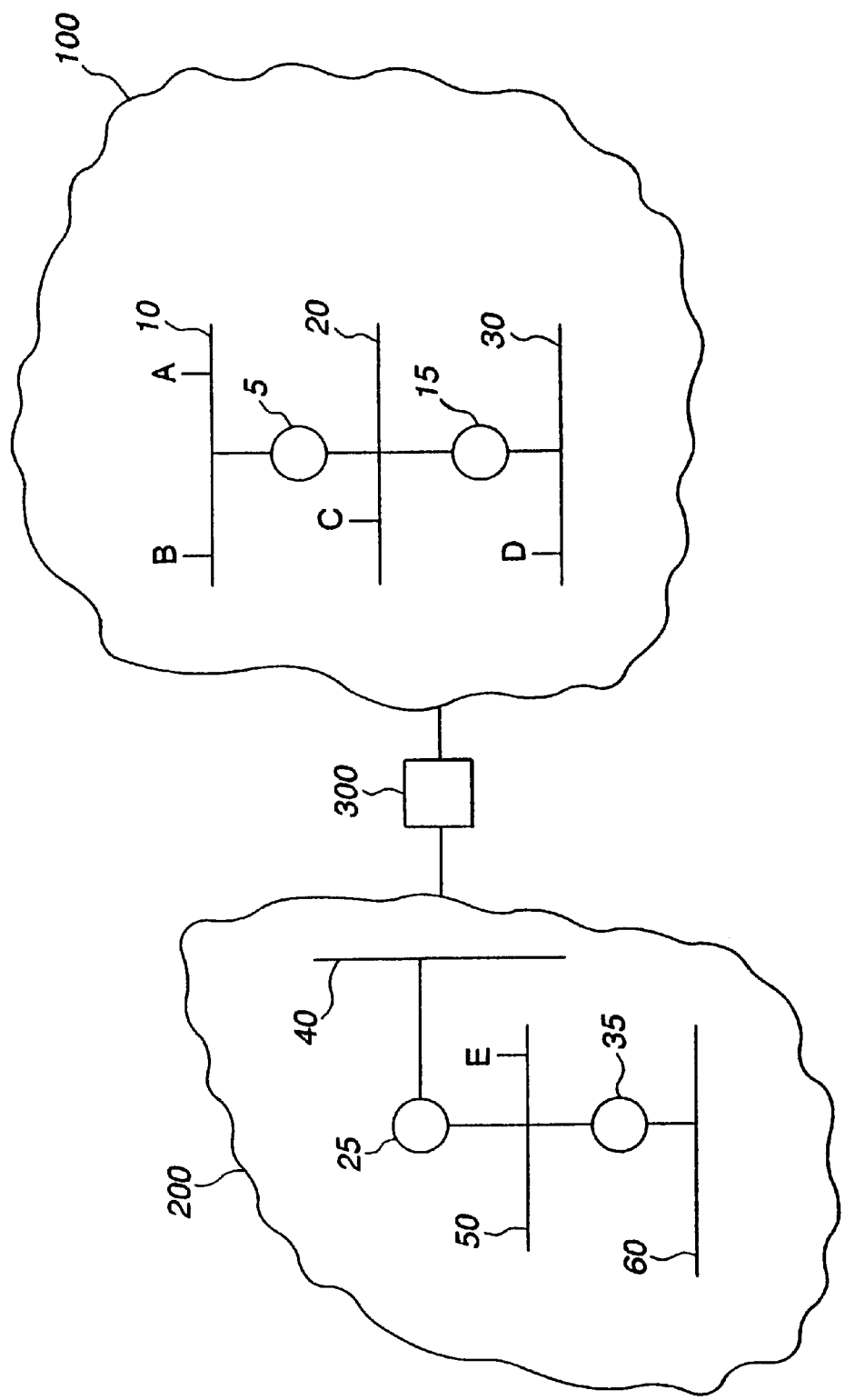
FIG. 1 depicts a prior art LAN configuration.
Figure 2:
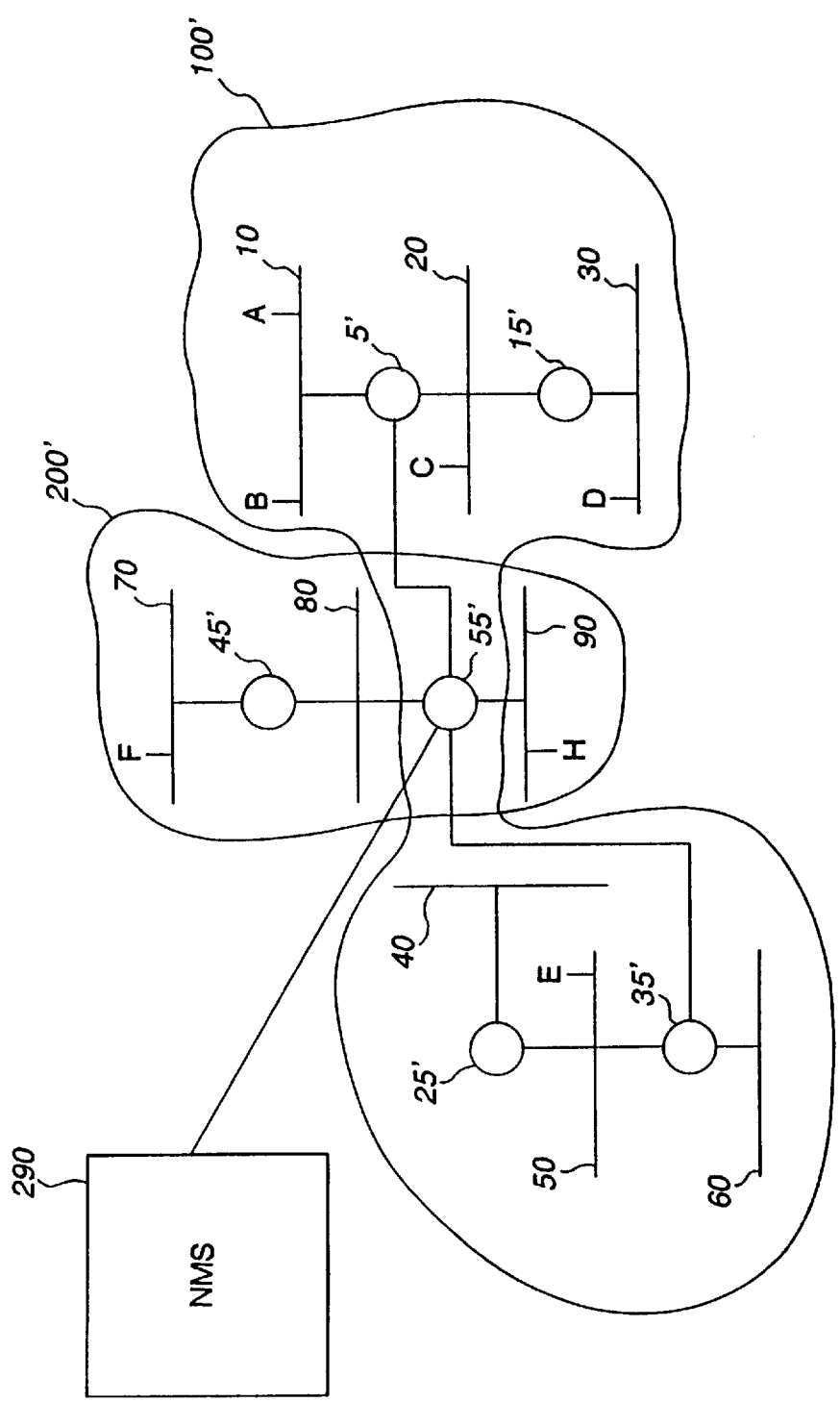
FIG. 2 depicts a prior art VLAN configuration.
Figure 3:
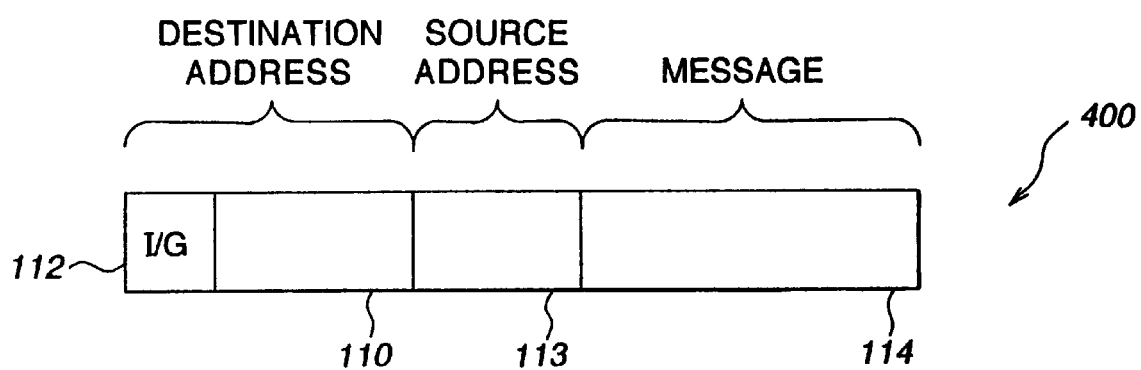
FIG. 3 depicts a conventional LAN message packet.
Figure 4:
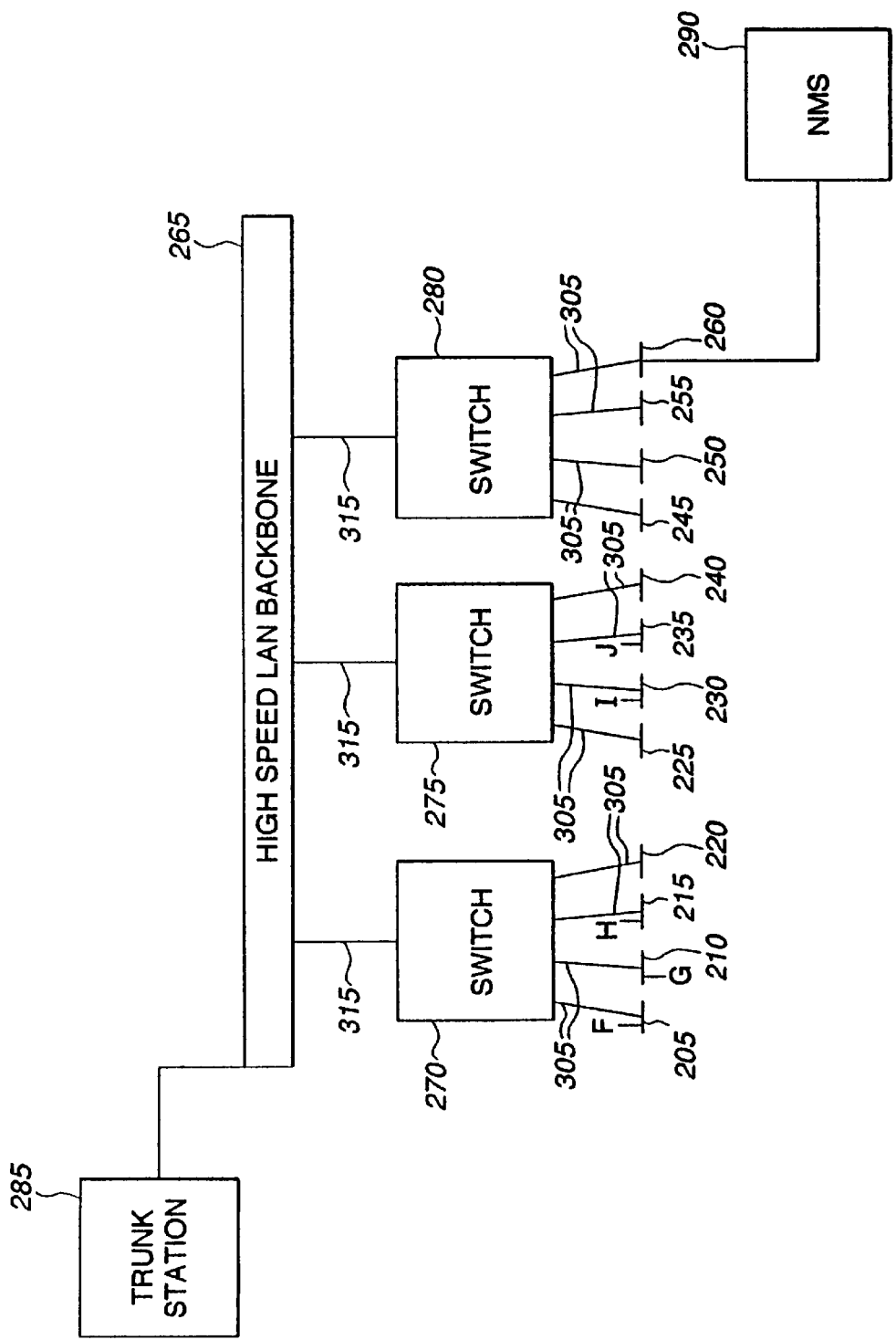
FIG. 4 depicts a schematic diagram of a conventional VLAN system.
Figure 5:
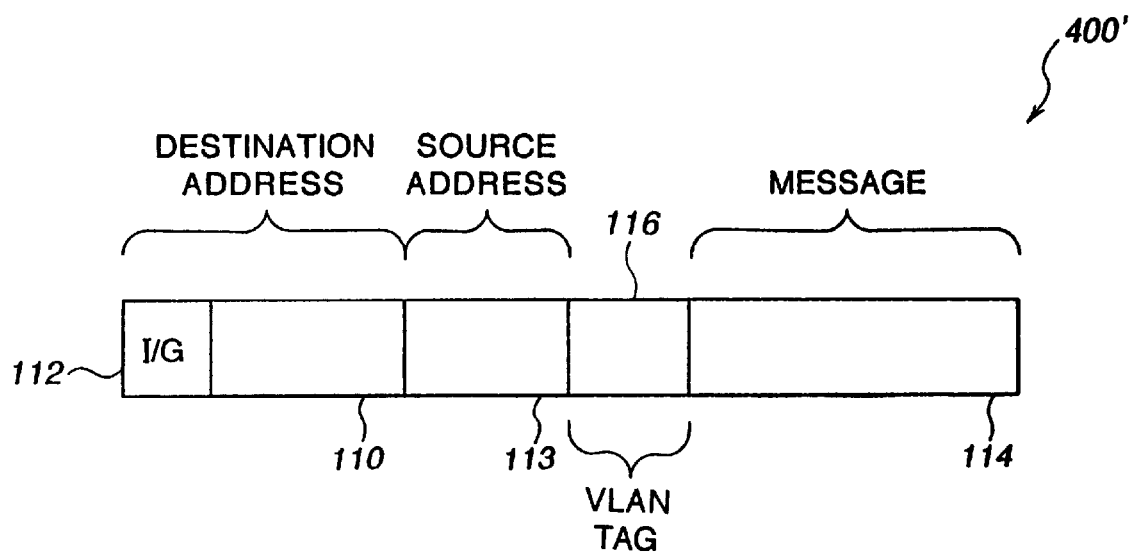
FIG. 5 depicts a conventional VLAN message packet.
Figure 9:
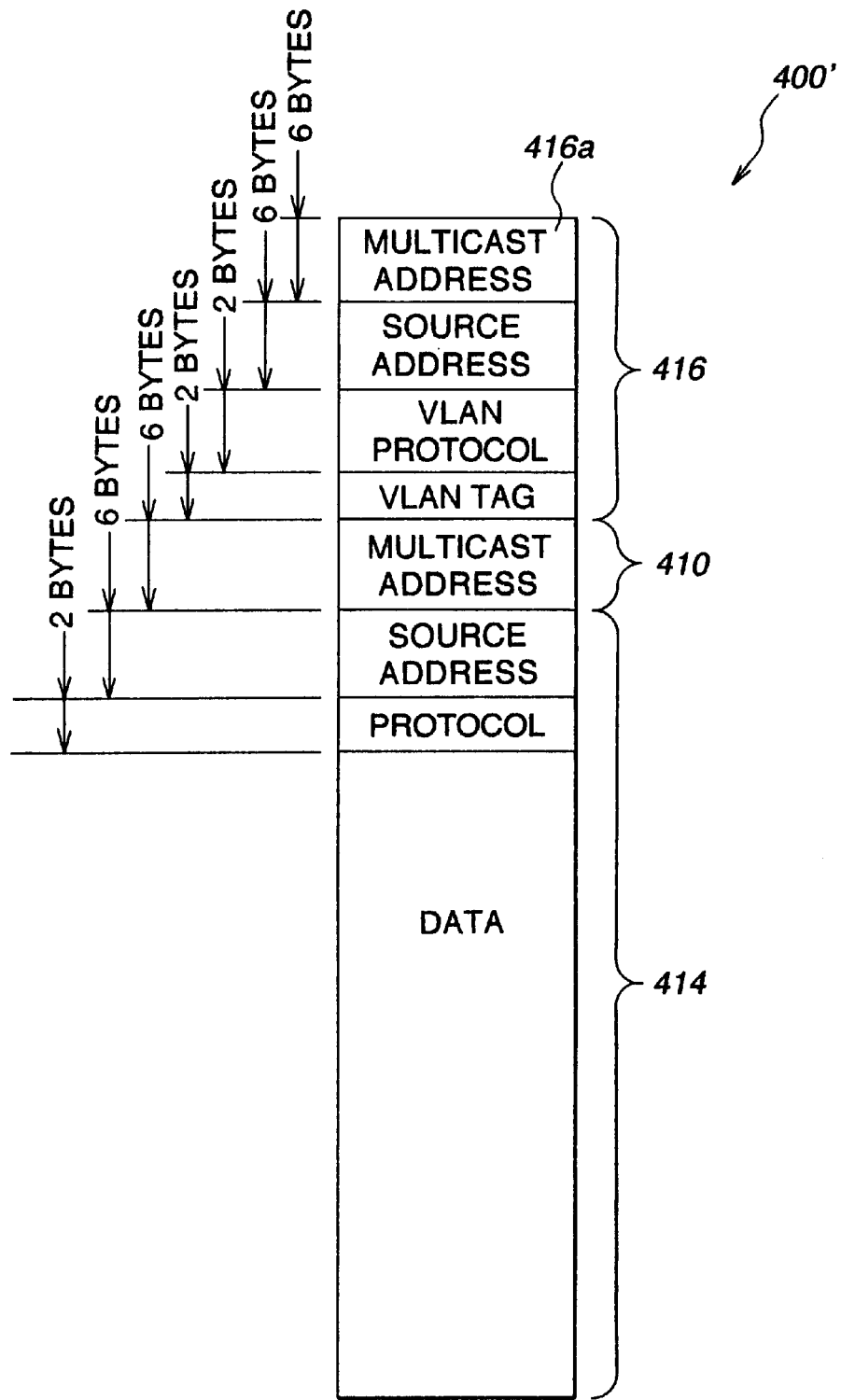
FIG. 9 depicts a conventional VLAN communication packet.

FIG. 9 depicts a conventional VLAN communication packet 400' which includes further detail than that depicted in FIG. 5. As indicated, the VLAN header 416 typically consists of multiple layers, the head or top layer of which has, for multicast communications, a multicast address 416A which is included in a portion of the header having 6 bytes. The header 416 also includes a layer with 6 bytes for the source address, a 2-byte layer for the VLAN protocol and a 1 or 2 byte layer for the VLAN tag.

The remaining portion of the VLAN communication packet consists of the communications packet received from the applicable LAN 205–260 at the applicable switch 270', 275' or 280'. Accordingly, the VLAN communications packet 400' consists of a portion which is the appended VLAN header 416 and a portion which is the original communication formed of sections 410 and 414. The section 410 is the multicast address which includes all VLAN members to whom the sender desires the message data to be forwarded. The remaining portion of the communication consists of the section 414 which includes the source address, i.e., the address of the sender, the LAN protocol, and the message data all within the portion of the communication packet which was originally forwarded from the sender's LAN. As indicated in FIG. 9, the portion of the communication packet which is forwarded from the sender's LAN includes a top or head layer of 6 bytes with the multicast address, a second layer also of 6 bytes having the source address, a further 2-byte layer for the LAN protocol and a layer for the message data.

In conventional VLAN communication packets of the type depicted in FIG. 9, the multicast address 416a at the head of the VLAN header 416 is identical to the multicast address in layer 410 which sits at the head of the communication originally forwarded from the sender's LAN. In order to increase system efficiency, VLAN managers have sometimes deviated from standard VLAN procedures by programming or configuring VLAN trunk stations to read the address at the head of the VLAN header, e.g., multicast address 416a. Then assuming that the address is understood, the applicable trunk station ignores the next 8 bytes of information so as to expedite the processing of the message data in section 414 of the communication packet 400'.

Accordingly, many existing VLAN systems include trunk stations which efficiently provide expedited processing by complying with such non-standard procedures. Such non-standard procedures can be utilized in conventional VLAN systems because trunk stations are not included in VLAN networks. Accordingly, a communication with a multicast address including a trunk station in a conventional VLAN environment must necessarily be addressed only to trunk stations and members of the default VLAN and, hence, be delivered via the backbone LAN 265 without a VLAN header 416. The trunk station detects and understands the multicast address, ignores the 8 bytes of information related to the source address and protocol and proceeds immediately to the message data to begin processing.

However, with a trunk station included in the VLAN, the multicast communication originally transmitted from the sender's LAN must be appended with the VLAN header 416 in order to reach other members of the VLAN to whom the message is addressed. As described previously, the communication can be duplicated such that the multicast communication is transmitted over the backbone LAN 265 both with and without the standard VLAN header 116. However, using this procedure, when a trunk station which operates under the special high-efficiency protocols implemented by some network managers receives the packet 400' from the backbone LAN, it reads the multicast address 416a of the VLAN header 416 and proceeds immediately to ignore the next 8 bytes of information so as to expedite processing of the message data. Because the multicast address which is detected and recognized by the trunk station is part of the VLAN header 416 rather than the original communication forwarded from the sender's LAN, the trunk station will skip or jump to unknown data rather than to the head of the message data within section 414 of the original communication portion 414 of the communication packet 400'.

For example, as shown in prior 414 FIG. 9, the trunk station will jump to the top or head of the VLAN tag and attempt to process this and the sequentially following data as if it is message data. This will result in a corruption of the data stored on the server and/or in processed data provided to network users. Hence, the trunk server will receive and properly process one of the duplicate copies of the communication originally forwarded from the sender's LAN, i.e., the copy which is transmitted without the VLAN header, and will also receive and improperly process the other copy of the communication originally forwarded from the sender's LAN, i.e., the copy appended with the VLAN header.

Figure 10:
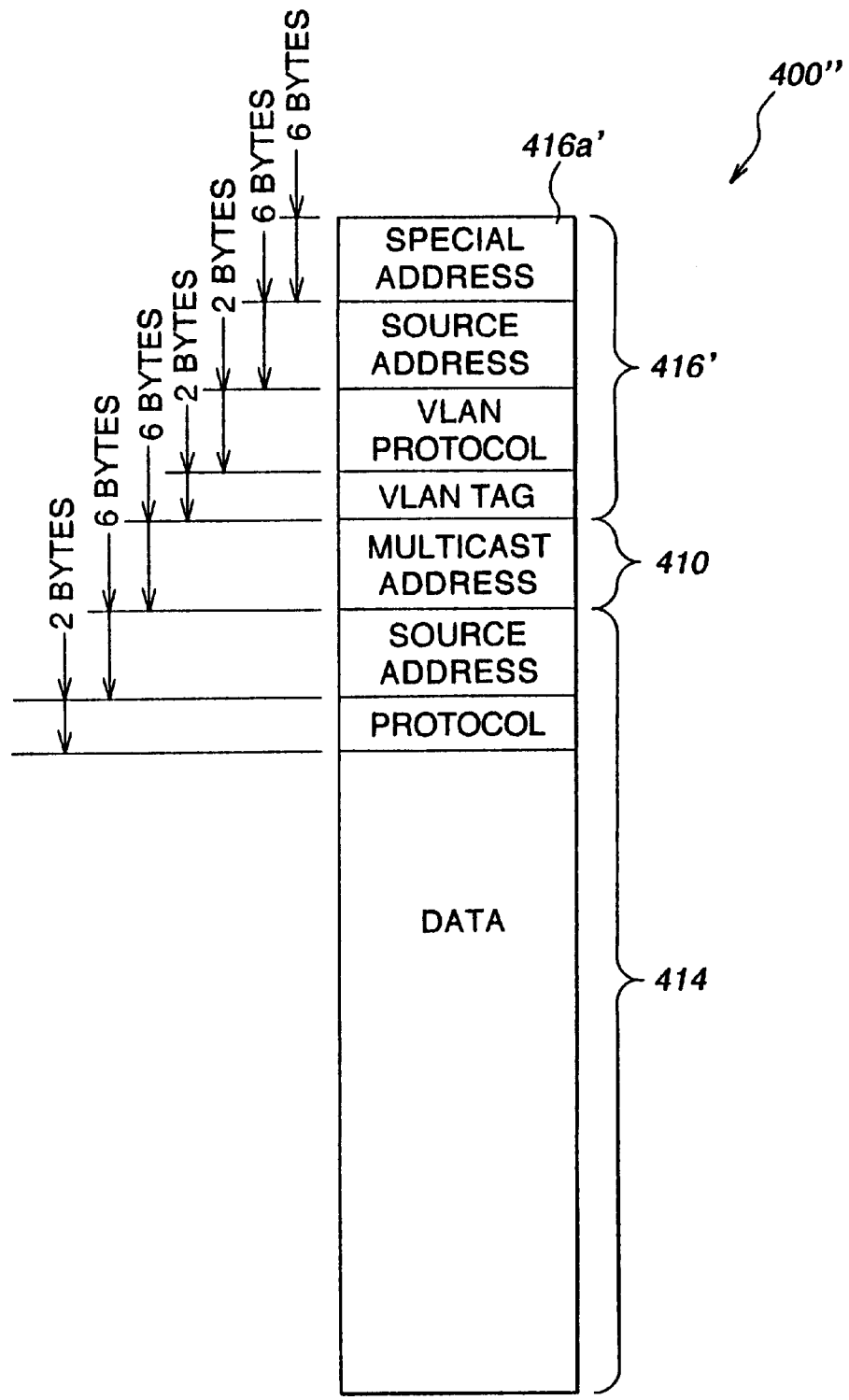
FIG. 10 depicts a VLAN communication packet in accordance with the present invention.

In accordance with the present invention, each trunk station within a particular VLAN and each switch is instructed by the NMS 290' so as to be configured or programmed to include a special destination address 460a' within the VLAN header 416' of communication packet 400" as shown in FIG. 10. The special destination address 416a' is different than the multicast address 416a which is contained in layer 410. However, the special destination address 416a' corresponds to the multicast address 416a and accordingly is recognized by the network switches 270', 275' and 280' having access ports to LAN's included in the multicast group. Hence, after being properly instructed by the NMS 290', upon detecting a destination address 416a', a switch having an access port to a LAN included within the multicast address group, will remove the VLAN header 416' and forward the remainder of the communication 410 and 414 to the appropriate LAN or LAN's for delivery to the applicable addressee. The trunk station, on the other hand, will detect but fail to recognize the special destination address 416a' and will accordingly ignore and/or discard the communication packet 400". Accordingly, the trunk station will not process the duplicate message transmitted with the VLAN header and will neither store corrupted data nor provide corrupted processing results.

Referring again to FIG. 8, in the VLAN networks shown, if a multicast communication is forwarded from LAN 250, the multicast communication directed from the LAN 250 will be duplicated by the switch 280', to which the LAN 250 is connected by an access port 305. One copy of the duplicated communication will be forwarded via the LAN backbone trunk 265 without a VLAN header. If the trunk station 285 is included as a multicast addressee, the trunk station will detect and recognize this communication based upon the multicast address at the head of the communication, i.e., the communication forwarded without a VLAN header.

The switch 280' will also, in accordance with instructions previously received from the NMS 290' during configuration of the VLAN 800, append the VLAN header 416' to the other copy of the communication to form a VLAN communication packet 400" having a special destination address 416a', which is not recognizable to the trunk stations, at the head of the packet. The trunk stations will therefore ignore and/or discard the VLAN packet 400". Each of the other switches 270' and 275' will receive the VLAN communication packet 400". If, for example, the multicast addressees include a member of LAN 235, the switch 275' having an access port to that LAN will detect and recognize the special destination address 416a' as equivalent to the multicast address in the layer 410 of the communication packet 400". It will accordingly remove the header 416 and forward the remainder of the packet 410 and 414 to the LAN 235 for delivery to the applicable addressee in accordance with the multicast address within layer 410 which, with the VLAN header 416' removed, resides at the head or top of the remainder of the communication packet 410 and 414. Accordingly, by duplicating multicast communications and using the special multicast or destination address 416a', both the appropriate trunk stations and LAN's receive the communication while ensuring that corrupted data will not be stored on the trunk stations or provided to the network members.

As described in detail above, the present invention provides a VLAN system which facilitates multicast communications to trunk stations in a manner which allows efficient processing and avoids corruption of data.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, those skilled in the art will recognize that its usefulness is not limited thereto and that the present invention can be beneficially utilized in any number of environments and implementations. Accordingly, the claims set forth below should be construed in view of the full breadth and spirit of the invention as disclosed herein.

What is claimed is:

1. A switch for use in a virtual communications system having multiple local area networks interconnected by multiple switches through a trunk that has one or more trunk stations connected directly thereto, the switch comprising:

a first communications port connected directly to a first local area network within a virtual local area network configured to include a second local area network and a trunk station;

a second communications port connected directly to the trunk; and a switch control to detect a multicast communication from the first local area network having a multicast destination address representing desired destination addresses, said desired destination addresses including the trunk station, to append a VLAN header having a special destination address, different than but corresponding to the multicast address, to the multicast communication to form a VLAN communication, and to direct transmission of the VLAN communication to the second communication port, wherein the special destination address is not recognizable by the trunk station as a valid multicast address.

2. The switch according to claim 1, wherein the switch control is further configured to duplicate the multicast communication to form a first multicast communication and a second multicast communication, to append the VLAN header only to the first multicast communication to form the VLAN communication, and to direct transmission of the second multicast communication to the second communication port.

3. The switch according to claim 1, wherein the desired destination addresses include the second local area network.

4. The switch according to claim 1, wherein the switch is a multiported reconfigurable switch, the first communications port is an access port, the second communications port is a first trunk port and the trunk station is connected to the trunk by a second trunk port.

5. A method of communicating messages in a virtual communications system having multiple local area networks interconnected by multiple switches through a trunk which has one or more trunk stations connected directly thereto, the method comprising steps of:

detecting a multicast communication from a first local area network within a virtual local area network configured to include a second local area network and a trunk station, wherein the multicast communication includes a multicast address representing desired destination addresses, said desired destination addresses including the trunk station;

appending a VLAN header having a special destination address, different than but corresponding to the multicast address, to the multicast communication to form a VLAN communication; and directing transmission of the VLAN communication to the trunk, wherein the special destination address is not recognizable by the trunk station as a valid multicast address.

6. The method of communicating messages in a virtual communications system according to claim 5, further comprising steps of:

duplicating the multicast communication to form a first multicast communication and a second multicast communication; and directing transmission of the second multicast communication to the trunk, wherein the first multicast communication is appended with the VLAN header.

7. The method of communicating messages in a virtual communications system according to claim 5, wherein the desired destination addresses include the second local area network.

8. A switch for use in a virtual communications system having multiple local area networks interconnected by multiple switches through a trunk which has one or more trunk stations connected directly thereto, the switch comprising:

a first communications port connected directly to a first local area network within a virtual local area network configured to include a second local area network and a trunk station;

a second communications port connected directly to the trunk; and a switch control to detect a VLAN communication received at the second communications port from the second local area network, the VLAN communication including a communication with a multicast address representing multiple destination addresses including at least one address within the first local area network and the trunk station, and a VLAN header with a special destination address, different than but corresponding to the multicast address, appended to the communication, to remove the VLAN header from the VLAN communication, and to direct transmission of the communication to the first communication port, wherein the special destination address is not recognizable by the trunk station as a valid multicast address.

9. The switch according to claim 8, wherein the switch is a multiported reconfigurable switch, the first communications port is an access port, the second communications port is a first trunk port and the trunk station is connected to the trunk by a second trunk port.

10. A method of communicating messages in a communications system having multiple local area networks interconnected by multiple switches through a trunk which has one or more trunk stations connected directly thereto, the method comprising steps of:

detecting a VLAN communication, wherein the VLAN communication includes (i) a multicast communication with a multicast address representing desired destination addresses including a member of a first local area network and a trunk station within a virtual local area network configured to include a second local area network and the trunk station and (ii) a VLAN header having a special destination address, different than but corresponding to the multicast address, appended to the communication;

removing the VLAN header from the VLAN communication; and directing transmission of the multicast communication to the first local area network, wherein the special destination address is not recognizable by the trunk station as a valid multicast address.

11. A virtual communications system, comprising:

a trunk;

a first switch connected to the trunk by a first trunk port;

a second switch connected to the trunk by a second trunk port;

a trunk station connected to the trunk by a third trunk port;

a first local area network connected to the first switch by a first access port;

a second local area network connected to the second switch by a second access port; and a network manager interconnected to the first and the second switches to configure a virtual local area network including the first and the second local area networks and the trunk station, wherein the first switch is operative to detect a multicast communication from the first local area network having a multicast address representing desired destination addresses including the second local area network and the trunk station, to append a VLAN header having a special destination address, different than but corresponding to the multicast address, to the multicast communication to form a VLAN communication, and to direct transmission of the VLAN communication to the trunk, wherein the special destination address is not recognizable by the trunk station as a valid multicast address.

12. The communications system according to claim 11, wherein the second switch is operative to detect the VLAN communication, to remove the VLAN header from the VLAN communication, and to direct transmission of the multicast communication to the second local area network.

13. The virtual communications system according to claim 11, wherein:

the first switch is further operative to duplicate the multicast communication to form a first multicast communication and a second multicast communication, to append a VLAN header only to the first multicast communication, and to direct transmission of the second multicast communication to the trunk.

14. The communications system according to claim 13, wherein the trunk station is operative to detect the second multicast communication and to ignore the VLAN communication.

15. A method of communicating in a virtual communications system having a trunk, a first switch connected to the trunk by a first trunk port, a second switch connected to the trunk by a second trunk port, a trunk station connected to the trunk by a third trunk port, a first local area network connected to the first switch by an access port, a second local area network connected to the second switch by an access port, and a network manager interconnected to the first and the second switches to configure virtual local area networks, the method comprising steps of:

configuring a virtual local area network including the first and second local area networks and the trunk station, detecting a multicast communication from the first local area network having a multicast address representing desired destination addresses including a member of the second local area network and the trunk station;

appending a VLAN header having a special destination address, different than but corresponding to the multicast address, to the detected multicast communication to form a VLAN communication; and directing transmission of the VLAN communication to the trunk, wherein the special destination address is not recognizable by the trunk station as a valid multicast address.

16. The method of communicating in a virtual communications system according to claim 15, further comprising steps of:

detecting the transmitted VLAN communication;

removing the VLAN header from the detected VLAN communication to obtain the multicast communication; and directing transmission of the obtained multicast communication to the second local area network.

17. The method of communicating in a virtual communications system according to claim 15, further comprising steps of:

duplicating the detected multicast communication to form a first multicast communication and a second multicast communication, the VLAN header being appended only to the first multicast communication; and directing transmission of the second multicast communication to the trunk.

18. The method of communicating in a virtual communications system according to claim 17, wherein the trunk station is configured to detect the transmitted second multicast communication and to ignore the transmitted VLAN communication.

* * * * *